(12) United States Patent
Chen

(10) Patent No.: US 7,493,701 B2
(45) Date of Patent: Feb. 24, 2009

(54) SELF-LEVELING LASER APPARATUS AND A METHOD FOR CONTROLLING THE SAME

(75) Inventor: Ming Chen, Jiangsu (CN)

(73) Assignee: Chevron Limited (CN)

( * ) Notice: Subject to any disclaimer, the term of this patent is extended or adjusted under 35 U.S.C. 154(b) by 0 days.

(21) Appl. No.: 11/804,242

(22) Filed: May 17, 2007

(65) Prior Publication Data

US 2008/0028624 A1 Feb. 7, 2008

(30) Foreign Application Priority Data

May 26, 2006 (CN) .................... 2006 1 0040690

(51) Int. Cl.
*G01C 5/00* (2006.01)
*G01C 15/00* (2006.01)
(52) U.S. Cl. .................. 33/291; 33/286; 33/DIG. 21
(58) Field of Classification Search .............. 33/227, 33/228, 281–283, 285, 286, 290, 291, DIG. 21, 33/391, 397, 401, 402; 356/250; 250/559.3
See application file for complete search history.

(56) References Cited

U.S. PATENT DOCUMENTS

| | | | |
|---|---|---|---|
| 3,691,850 A | 9/1972 | Slater et al. | |
| 3,759,616 A | 9/1973 | Hildebrand | |
| 3,891,050 A | * 6/1975 | Kirkpatrick et al. | ......... 181/102 |
| 4,247,809 A | 1/1981 | Nessel | |
| 4,676,103 A | 6/1987 | Nakajima | |
| 4,718,171 A | 1/1988 | Schlemmer et al. | |
| 4,751,782 A | 6/1988 | Ammann | |
| 4,781,457 A | 11/1988 | Hirano et al. | |
| 4,830,489 A | 5/1989 | Cain et al. | |
| 4,852,265 A | 8/1989 | Rando et al. | |
| 4,854,703 A | 8/1989 | Ammann | |
| 4,912,851 A | 4/1990 | Rando et al. | |
| 4,993,161 A | 2/1991 | Borkovitz | |
| 5,063,679 A | 11/1991 | Schwandt | |

(Continued)

FOREIGN PATENT DOCUMENTS

CA 2300241 9/2000

(Continued)

*Primary Examiner*—G. Bradley Bennett
*Assistant Examiner*—Amy Cohen Johnson
(74) *Attorney, Agent, or Firm*—McDermott Will & Emery LLP

(57) ABSTRACT

The present invention discloses a self-leveling laser apparatus, of which the pendulum can be locked, and a method for controlling the same. The self-leveling laser apparatus of the present invention comprises a housing, a pendulum hanging within the housing, at least one laser generator fixed on the pendulum, a power source electrically connected with the laser generator, and a locking device for fixing the pendulum. The locking device includes a motor, and a locking member which is activated by the motor and movable between a fixed position and a released position. The locking member has a locking surface, and the pendulum has a contacting surface. When the locking member is in the fixed position, the locking surface thereof contacts the contacting surface of the pendulum. When the locking member is in the released position, the locking surface thereof does not contact the contacting surface of the pendulum. The pendulum is fixed from swinging when the self-leveling laser apparatus is not in use so as to avoid unexpected damage or loss of precision.

10 Claims, 4 Drawing Sheets

U.S. PATENT DOCUMENTS

| | | | |
|---|---|---|---|
| 5,075,977 | A | 12/1991 | Rando |
| 5,144,487 | A | 9/1992 | Hersey |
| 5,148,018 | A | 9/1992 | Ammann |
| 5,182,863 | A | 2/1993 | Rando |
| 5,218,770 | A | 6/1993 | Toga |
| 5,287,627 | A | 2/1994 | Rando |
| D348,227 | S | 6/1994 | Nielsen et al. |
| 5,331,395 | A | 7/1994 | Piske et al. |
| 5,367,779 | A | 11/1994 | Lee |
| 5,400,514 | A | 3/1995 | Imbrie et al. |
| 5,446,635 | A | 8/1995 | Jehn |
| D363,240 | S | 10/1995 | Hirakawa et al. |
| 5,459,932 | A | 10/1995 | Rando et al. |
| 5,485,266 | A | 1/1996 | Hirano et al. |
| 5,500,524 | A | 3/1996 | Rando |
| 5,519,942 | A | 5/1996 | Webb |
| 5,524,352 | A | 6/1996 | Rando et al. |
| D371,309 | S | 7/1996 | Webb |
| 5,531,031 | A | 7/1996 | Green |
| 5,539,990 | A | 7/1996 | Le |
| 5,541,727 | A | 7/1996 | Rando et al. |
| 5,561,911 | A | 10/1996 | Martin |
| 5,572,797 | A | 11/1996 | Chase |
| D376,111 | S | 12/1996 | Ishii |
| 5,581,034 | A | 12/1996 | Dao et al. |
| 5,594,993 | A | 1/1997 | Tager et al. |
| 5,604,987 | A | 2/1997 | Cupp |
| 5,617,202 | A | 4/1997 | Rando |
| 5,621,975 | A | 4/1997 | Rando |
| 5,636,018 | A | 6/1997 | Hirano et al. |
| D383,075 | S | 9/1997 | Sawaguchi et al. |
| D389,758 | S | 1/1998 | Motamed |
| 5,742,387 | A | 4/1998 | Ammann |
| 5,745,623 | A | 4/1998 | Ohtomo et al. |
| 5,754,582 | A | 5/1998 | Dong |
| 5,760,932 | A | 6/1998 | Perchak |
| 5,784,792 | A | 7/1998 | Smith |
| D396,817 | S | 8/1998 | Webb |
| D397,627 | S | 9/1998 | Webb |
| D399,145 | S | 10/1998 | Ho |
| 5,819,424 | A | 10/1998 | Ohtomo et al. |
| 5,836,081 | A | 11/1998 | Orosz, Jr. |
| 5,838,431 | A | 11/1998 | Hara et al. |
| D402,218 | S | 12/1998 | Kennison |
| 5,842,282 | A | 12/1998 | Ting |
| 5,864,956 | A | 2/1999 | Dong |
| 5,872,657 | A | 2/1999 | Rando |
| 5,898,490 | A | 4/1999 | Ohtomo et al. |
| D409,508 | S | 5/1999 | Gallagher |
| D411,470 | S | 6/1999 | Webb |
| 5,907,907 | A | 6/1999 | Ohtomo et al. |
| 5,914,778 | A | 6/1999 | Dong |
| D411,809 | S | 7/1999 | Wakabayashi |
| D412,857 | S | 8/1999 | Howard et al. |
| 5,946,087 | A | 8/1999 | Kasori et al. |
| D415,436 | S | 10/1999 | Martone |
| 5,960,551 | A | 10/1999 | Nishi et al. |
| 5,966,826 | A | 10/1999 | Ho |
| D416,856 | S | 11/1999 | Onose |
| 5,983,510 | A | 11/1999 | Wu et al. |
| 5,992,029 | A | 11/1999 | Dong |
| D417,633 | S | 12/1999 | Sato et al. |
| 6,005,719 | A | 12/1999 | Rando |
| D418,432 | S | 1/2000 | Krantz |
| D418,433 | S | 1/2000 | Krantz |
| D418,434 | S | 1/2000 | Krantz |
| D418,763 | S | 1/2000 | Krantz |
| 6,009,630 | A | 1/2000 | Rando |
| 6,012,229 | A | 1/2000 | Shino |
| 6,014,211 | A | 1/2000 | Middleton et al. |
| D420,972 | S | 2/2000 | Brecher et al. |
| 6,055,046 | A | 4/2000 | Cain |
| 6,065,217 | A | 5/2000 | Dong |
| 6,073,353 | A | 6/2000 | Ohtomo et al. |
| D429,481 | S | 8/2000 | Ishii |
| 6,133,996 | A | 10/2000 | Plumb et al. |
| 6,151,106 | A | 11/2000 | Ohtomo et al. |
| 6,151,787 | A | 11/2000 | Wright et al. |
| 6,163,969 | A | 12/2000 | Jan et al. |
| 6,167,630 | B1 | 1/2001 | Webb |
| 6,178,649 | B1 | 1/2001 | Wu |
| 6,184,979 | B1 | 2/2001 | Hirano et al. |
| 6,195,902 | B1 | 3/2001 | Jan et al. |
| 6,202,312 | B1 | 3/2001 | Rando |
| 6,209,219 | B1 | 4/2001 | Wakefield et al. |
| 6,222,625 | B1 | 4/2001 | Johnston |
| 6,249,338 | B1 | 6/2001 | Ohtomo et al. |
| 6,249,983 | B1 | 6/2001 | Wright et al. |
| 6,262,801 | B1 | 7/2001 | Shibuya et al. |
| 6,293,024 | B1 | 9/2001 | Fiebig et al. |
| 6,351,890 | B1 | 3/2002 | Williams |
| 6,360,446 | B1 | 3/2002 | Bijawat et al. |
| D455,664 | S | 4/2002 | Webb |
| D457,446 | S | 5/2002 | Kallabis |
| 6,407,803 | B1 | 6/2002 | Schrank |
| D460,924 | S | 7/2002 | Hitchcock |
| D461,135 | S | 8/2002 | Watson et al. |
| 6,427,348 | B1 | 8/2002 | Webb |
| 6,430,823 | B1 | 8/2002 | Seki |
| 6,449,856 | B1 | 9/2002 | Matsumoto et al. |
| D464,578 | S | 10/2002 | Zurwelle |
| 6,459,483 | B1 | 10/2002 | Shafer et al. |
| 6,487,783 | B1 | 12/2002 | Thomas, Jr. |
| 6,493,067 | B1 | 12/2002 | Kodaira et al. |
| 6,493,955 | B1 | 12/2002 | Moretti |
| D469,369 | S | 1/2003 | Durkin |
| D469,556 | S | 1/2003 | Malard et al. |
| D469,738 | S | 2/2003 | Ishii |
| D470,423 | S | 2/2003 | Loudenslager et al. |
| D470,424 | S | 2/2003 | Hand et al. |
| 6,532,676 | B2 | 3/2003 | Cunningham |
| 6,556,283 | B2 | 4/2003 | Shirai et al. |
| D474,985 | S | 5/2003 | Cooper et al. |
| 6,568,094 | B2 * | 5/2003 | Wu .............................. 33/281 |
| D475,938 | S | 6/2003 | Lopano |
| 6,577,388 | B2 | 6/2003 | Kallabis |
| D476,584 | S | 7/2003 | Zurwelle |
| 6,606,798 | B2 | 8/2003 | El-Katcha |
| 6,688,011 | B2 * | 2/2004 | Gamal et al. .................. 33/290 |
| 6,691,420 | B2 * | 2/2004 | Tamamura .................... 33/286 |
| 6,735,879 | B2 | 5/2004 | Malard et al. |
| 6,739,062 | B2 | 5/2004 | Jan et al. |
| 6,763,595 | B1 * | 7/2004 | Hersey ......................... 33/286 |
| 6,763,596 | B1 * | 7/2004 | Puri et al. ..................... 33/286 |
| 6,829,834 | B1 | 12/2004 | Krantz |
| 6,914,930 | B2 | 7/2005 | Raskin et al. |
| 7,059,057 | B2 * | 6/2006 | Raskin et al. ................. 33/286 |
| 7,076,880 | B2 * | 7/2006 | Sergyeyenko et al. ......... 33/286 |
| 7,111,406 | B2 * | 9/2006 | Sergyeyenko et al. ......... 33/291 |
| 2002/0073561 | A1 | 6/2002 | Liao |
| 2002/0166249 | A1 | 11/2002 | Liao |
| 2002/0178596 | A1 | 12/2002 | Malard |
| 2004/0123473 | A1 | 7/2004 | Malard et al. |
| 2004/0187327 | A1 | 9/2004 | Levine |
| 2005/0066533 | A1 | 3/2005 | Wheeler et al. |
| 2005/0078303 | A1 | 4/2005 | Murray |

FOREIGN PATENT DOCUMENTS

| | | |
|---|---|---|
| CN | 96209131.6 | 3/1998 |
| DE | 197 41 726 | 9/1997 |
| EP | 0 735 505 | 10/1996 |
| GB | 2 281 714 | 3/1995 |
| JP | 361100436 | 5/1986 |

| WO | WO 00/73989 | 12/2000 | WO | WO 03/074970 | 9/2003 |
| WO | WO 01/13320 | 2/2001 | | | |
| WO | WO 02/067190 A3 | 8/2002 | * cited by examiner | | |

SELF-LEVELING LASER APPARATUS AND A METHOD FOR CONTROLLING THE SAME

CROSS-REFERENCE TO RELATED APPLICATIONS

This application claims priority to Chinese Application No. 200610040690.9 filed May 26, 2006, the entire disclosure of which is incorporated herein by reference. Priority to this application is claimed under 35 U.S.C. 119, 120 and/or 365.

FEDERALLY SPONSORED RESEARCH OR DEVELOPMENT

Not Applicable.

TECHNICAL FIELD

The present invention relates to a self-leveling laser apparatus, especially to a self-leveling apparatus which can form a laser reference mark on an object surface, and further relates to a method for controlling the laser apparatus.

BACKGROUND OF THE INVENTION

In some engineering field such as construction and decoration, horizontal or perpendicular reference lines are often needed to facilitate other operations. Chinese Patent No. 96209131.6, with a title of "Three-dimensional Optical Levelling, Plumbing and Angle-calibrating Instrument", disclosed a self-leveling instrument which comprises a pendulum universally mounted on the frame for free swinging thereabout, laser generators and lens assembly mounted on the pendulum thereby to form a horizontal and a perpendicular laser reference lines on the object surface. Obviously it is facile to use this kind of self-leveling laser instrument comparing to manually line-marking. While new problems are occurred accompany with the self-leveling instrument. Since the pendulum is free swinging all the time, this may induce unexpected damage or loss of precision to the laser generator and lens assembly according to irregularly swinging of the pendulum during transportation or other movement of the leveling instrument, and thereby the use life of the instrument is reduced.

SUMMARY OF THE INVENTION

One of the objects of the present invention is to provide a self-leveling laser apparatus which is based on the present available technique while with the pendulum being able to be locked in a fixed position when the self-leveling laser apparatus is not used, and so as to avoid unexpected damage or loss of precision. Another object of the present invention is to provide a method for controlling the self-leveling laser apparatus as mentioned and required in the first object of the present invention.

To achieve the above-mentioned first object, a self-leveling laser apparatus of the present invention comprises a housing, a pendulum hanging within the housing, at least one laser generator fixed on the pendulum, a power source electrically connected with the laser generator, and a locking device for fixing the pendulum. The locking device further comprises a motor and a locking member which is activated by the motor and movable between a fixed position and a released position. The locking member has a locking surface, and the pendulum has a contacting surface. When the locking member is in the fixed position, the locking surface thereof contacts the contacting surface of the pendulum. When the locking member is in the released position, the locking surface thereof does not contact the contacting surface of the pendulum.

To control the self-leveling laser pendulum of the present invention, a method is provided to comprise the steps of:
  supplying power from a power source to the motor;
  providing a signal generator which produces a first signal to the motor when a distance between a portion of the housing and a first surface is within a predetermined range;
  the motor rotating in a first direction after the motor received the first signal, whereby the locking surface of the locking member moves away from the contacting surface of the pendulum.

Because the pendulum is fixedly locked relative to the housing when the self-leveling laser apparatus is not in use or moved away from a surface on which it stands, such that damages to the laser generator and optics, and loss of precision that may caused due to impact between the pendulum and the housing during the movement is avoided, and thereby the use life of the apparatus is extended.

BRIEF DESCRIPTION OF THE DRAWINGS

Advantages and novel features of the present invention will become apparent from the following detailed description of the preferred embodiment of the invention illustrated in the accompanying drawings, wherein.

DETAILED DESCRIPTION

Figure 1:
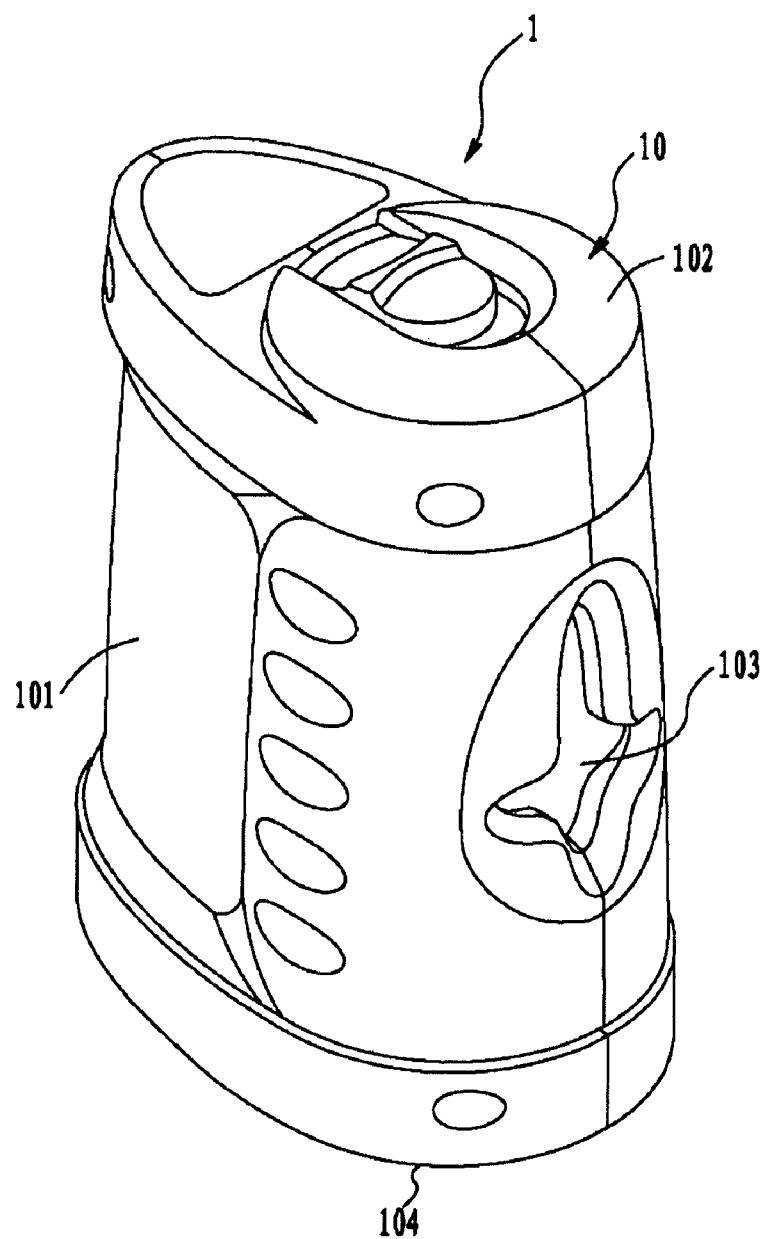
FIG. 1 is a is a perspective view of a self-leveling laser apparatus in accordance with a preferred embodiment of the present invention.
Figure 2:
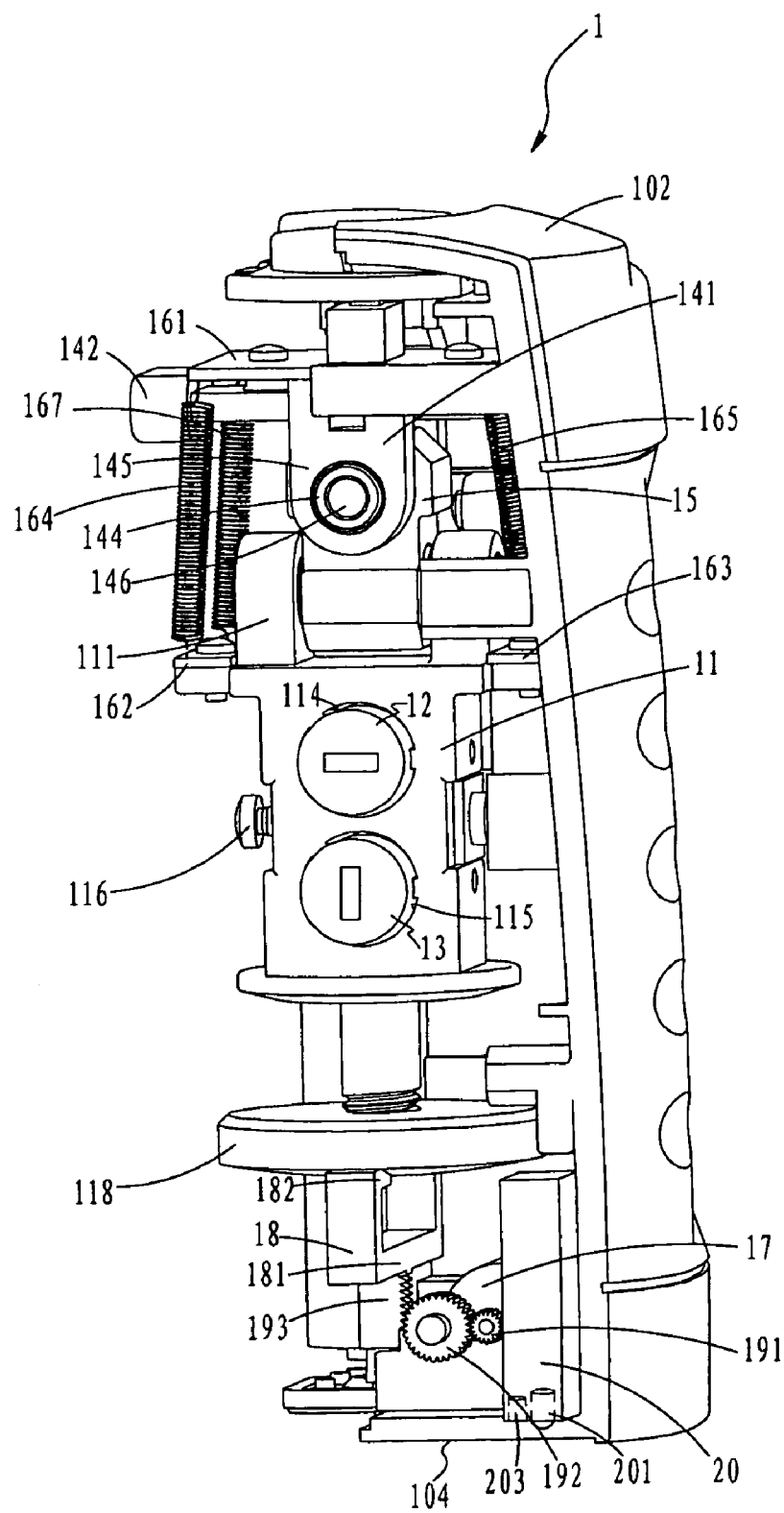
FIG. 2 is a perspective view of the self-leveling laser apparatus of FIG. 1 with a portion of the housing broken and exposing the interior conformation thereof.
Figure 3:
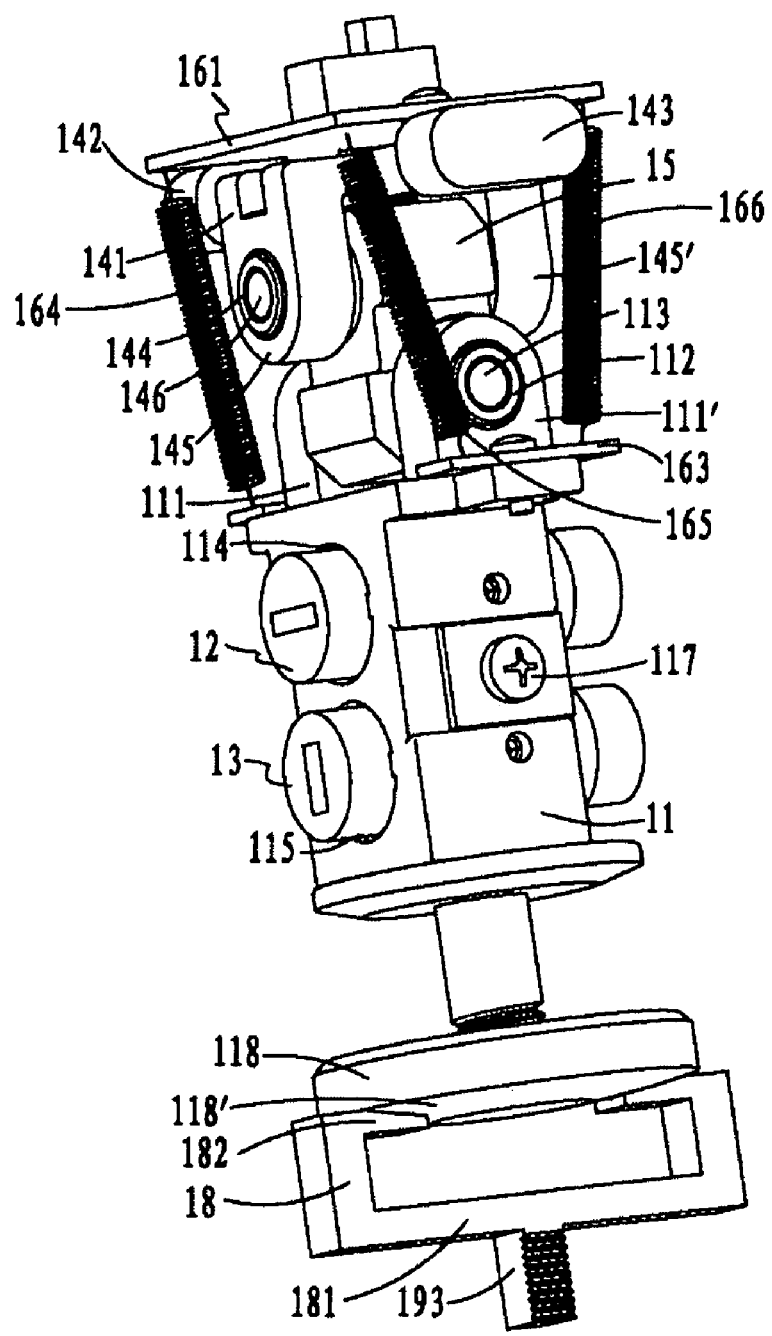
FIG. 3 is a perspective view of the pendulum and the locking device of the self-leveling laser apparatus illustrated in FIG. 1.
Figure 4:
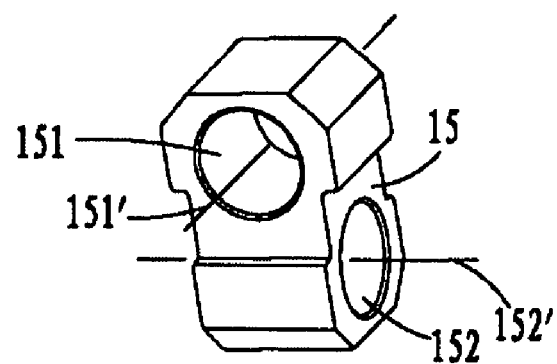
FIG. 4 is a perspective view of a connecting member as can be seen in FIG. 3.
Figure 5:
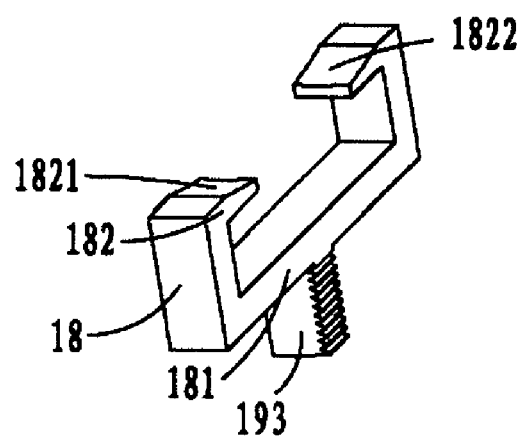
FIG. 5 is a perspective view of the locking device as can be seen in FIG. 3.

FIGS. 1-5 illustrate one preferred embodiment of the present invention, illustrated as a self-leveling laser apparatus 1. The laser apparatus 1 comprises a housing 10, a pendulum 11, a first laser module 12 and a second laser module 13.

In the preferred embodiment, the housing 10 is composed of two half clamshells 101, 102, and comprises a window 103 for allowing laser beams generated within the housing projecting therethrough. The housing further comprises a bottom surface 104 contactable with a surface on which the laser apparatus 1 standing.

A first bearing bracket 141 comprises two mounting portions 142, 143 laterally extending from the bearing bracket 141 and being received in mounting holes of the housing 10. A pair of first bearings 144 (one of which is not shown) respectively mounted in bearing holes in bearing supports 145, 145' of the bearing bracket 141. A first shaft rod 146 passes through a first through hole 151 on the upper portion of a connecting member 15, and with two ends thereof supported in the pair of first bearings 144. On the lower end of the connecting member 15, there's a second through hole 152 which has a central axis 152' perpendicular to a central axis 151' of the first through hole 151. In this embodiment, on upper portion of the pendulum 11 it has a pair of second bearing supports 111, 111' for receiving a pair of second bearings 112 (one of which is not shown) respectively. A second shaft rod 113 passes through the second through hole 152 with two ends thereof supported in the pair of second bearings 112. By such a mounting manner, the pendulum 11 is hung within the housing and is able to swing in at least two perpendicular directions. It is obvious to a person skilled in the art that the second bearing supports may mechanically mount to the pendulum instead of being integrated therewith. In other embodiment, the pendulum may be mounted by other connecting manners.

The laser apparatus 1 may also comprise a damping mechanism for attenuating swinging movement of the pendulum 11 such as to quicken stabilizing of the pendulum 11. In this embodiment, the damping mechanism is made of springs. A first connecting plate 161 is fixed on the top of the first bearing bracket 141 via screws. A second connecting plate 162 and a third connecting plate 163 are fixed on either side of the pendulum 11 respectively via screws. Four springs 164, 165, 166 and 167 are provided with one upper end thereof fixed to each of four corners of the first plate 161. The another end of each of the springs 164, 167 are fixed on the second plate 162, and the another end of each of the rest springs 165, 166 are fixed on the third plate 163, such that swinging movement of the pendulum 11 is gradually absorbed by the springs 164, 165, 166, 167. Other type of damping mechanism, i.e. a magnetic damping device on the basis of the prior art, may be also available.

The laser apparatus 1 further comprises a power source, preferably a series of battery cells. The power source is preferably positioned within the housing 10.

In this embodiment, the first laser module 12 and the second laser module 13 have the same constitution, each of which comprises a cylinder housing enclosing a laser diode and a collimating lens or a collimating lens assembly for collimating a laser beam generated from the laser diode. Two cavities 114, 115 are formed in the central portion of the pendulum 11 for receiving the laser modules 12, 13 respectively. The laser modules 12, 13 are electrically connectable to the power source such that when the connection is attained the laser modules project collimated laser beams. Optical units are provided in the transmitting direction of the laser beams for transforming the collimated laser beams into planar laser fans which subsequently form reference laser lines on an object surface to facilitate other operations such as brickwork, hanging ornaments, drilling, and cutting. The optical units are preferably cylinder lens. Chinese Patent No. 96209131.6 disclosed such a planar laser beam generating system, which is cited as a part of the present invention. Obviously, the optical units can be other types of optical apparatuses, such as curved reflectors, or dualistic optical elements, and so on. In this embodiment, to make it compact in size, the optical units are fixed in the cylinder housings of the laser modules. While in other embodiments, the optical units may be mounted on the pendulum or other suitable positions.

Two adjusting screws 116, 117 are provided to adjust the gravity center of the pendulum 11 during assembly procedure such that when the pendulum 11 is perpendicularly calmed, the planar laser beams projected from the laser modules 12, 13 respectively lies in a horizontal plane and a vertical plane, such that a horizontal laser reference line and a vertical laser reference line may be formed on a vertical object surface.

The laser apparatus 1 still comprises a locking device for fixing the pendulum on a fixed position. The locking device includes a motor 17 and a locking member 18. Preferably, the motor 17 electrically connected to the power source of the laser modules 12, 13. The motor may also connect to a separate power source such that the motor and the laser modules may be controlled separately. In this embodiment, the motor 17 is connected to the locking member 18 by a transmission unit, which comprises a pinion 191, a gear 192, and a rack 193. The pinion 191 is mounted on an output shaft of the motor 17 and engages the gear 192. The gear 192 engages the rack 193 subsequently. The locking member 18 is preferably a U-shaped member and is positioned beneath the lower portion 118 of the pendulum 11. The locking member 18 has an opening end 182 which comprises locking surfaces 1821, 1822 contactable with a contacting surface 118' on the bottom of the lower portion 118 of the pendulum 11. The locking member 18 also comprises a closed end 181 with the rack 193 formed thereon. When the motor 17 rotates in either direction, the rack 193 brings the locking member 18 to move a predetermined distance upwardly or downwardly. When the motor 17 rotates in positive direction to move the locking member 18 upwardly, the locking surfaces 1821, 1822 of the locking member 18 closely contact with the contacting surface 118' of the pendulum and hold the pendulum 11 in a fixed position against freely swinging. When the motor 17 rotates in the reversed direction to move the locking member 18 downwardly, the locking surfaces 1821, 1822 of the locking member 18 leave the contacting surface 118' of the pendulum and thus to release the pendulum 11.

Preferably, the contacting surface 118' of the lower portion 118 of the pendulum is either convex or concave with a spherical shape. The locking surfaces 1821, 1822 of the locking member 18 has a corresponding shape for mating with the contacting surface 118', such that in a predetermined scope, no matter where the pendulum 11 is, the locking surfaces can mate with the contacting surface and fixedly hold the pendulum.

It is obvious to those skilled in the art that the transmission unit can have other configurations such as worm driver, thread driver, etc. The locking member may also have other suitable shape and configuration.

The laser apparatus 1 comprises a photoelectric switch 20 mounted within the housing 1 and adjacent the bottom thereof. A control circuit is electrically connected to the photoelectric switch 20 and the motor 17. The photoelectric switch 20 comprises a light emitting member 201 for projecting a detecting light through an aperture on a bottom 104 of the housing 1, and a photoelectric detecting member 203, such as a PIN photodiode or an avalanche photodiode. The locking member 18 locks the pendulum 11 when the motor is not activated. When the motor 17 is electrically connected to the power source, and the distance between the bottom 104 of the housing and the surface for positioning the laser apparatus reaches a predetermined range, for example preferred 0-2 mm, the photoelectric detecting member 203 receives the reflected detecting light from the positioning surface, and generates a corresponding electrical signal subsequently. Thereby the control circuit responses the electrical signal generated from the photoelectric detecting member 203 and outputs a releasing signal to the motor 17 to driven the motor rotating in the reversed direction that moves the locking member 18 downwardly to release the pendulum 11. When the distance between the bottom 104 of the housing and the positioning surface is out of the predetermined range, the detecting member 203 can not receive the reflected detecting light from the positioning surface, and the motor will not rotate to move the locking member to release the pendulum even when the motor is electrically connected to the power source. When the pendulum 11 is released, once the detecting member 203 can not receive the reflected detecting light, the control circuit will output a locking signal to the motor 17 to driven the motor rotating in the positive direction that moves the locking member 18 upwardly to lock the pendulum 11.

Instead, other configurations may be used to control the rotation direction of the motor thereby to lock or release the pendulum.

The present invention is not intended to be limited to the above-mentioned embodiment. It is easily understood for those ordinary skilled in the art that there are various modifications or alternatives without departing the conception and principle of the present invention. The scope of the present invention is defined by the appended claims.

What is claimed is:

1. A self-leveling laser apparatus, comprising:
    a housing,
    a pendulum hanging within the housing,
    at least one laser generator fixed on the pendulum,
    a power source electrically connecting with the laser generator, and
    a locking device for fixing the pendulum,
    wherein the locking device comprising a motor and a locking member which is activated by the motor and movable between a fixed position and a released position wherein the locking member having a locking surface, and the pendulum having a contacting surface, when the locking member is in the fixed position, the locking surface thereof contacts the contacting surface of the pendulum, when the locking member is in the released position, the locking surface thereof does not contact the contacting surface of the pendulum,
    wherein the self-leveling laser apparatus further comprises a signal generator which is electrically connected with the motor and being operable to generate a locking signal and a releasing signal, and
    wherein the housing having a bottom surface for positioning the laser apparatus on a first surface, the signal generator comprising a light emitting member for projecting a detecting light on the first surface, and a detecting member for detecting the reflected detecting light from the first surface, and generating a corresponding electrical signal subsequently.

2. A self-leveling laser apparatus of claim 1, wherein the signal generator further comprising a control circuit which responses the electrical signal generated from the light detecting member and outputs the releasing signal to the motor.

3. A self-leveling laser apparatus of claim 1, wherein the bottom surface has a hole through which the detecting light generated from the light emitting member and reflected from the first surface passing.

4. A method for controlling a self-leveling laser apparatus as defined in claim 1, comprising the steps of:
    supplying power from the power source to the motor;
    providing a signal generator which produces a first signal to the motor when a distance between at least a portion of the housing and a first surface is within a predetermined range;
    the motor rotating in a first direction after the motor received the first signal, whereby the locking surface of the locking member moves away from the contacting surface of the pendulum.

5. A control method according to claim 4, wherein the at least one laser generator comprising a laser diode and a collimation lens, wherein the self-leveling laser apparatus further comprising an optical unit for transforming a laser beam generated from the laser generator into a planer laser.

6. A control method according to claim 4, wherein the self-leveling laser apparatus further comprising a transmission mechanism connecting the motor and the locking member.

7. A self-leveling laser apparatus of claim 1, wherein the locking surface of the locking member and the contacting surface of the pendulum are both spherical with a substantially same semidiameter.

8. A self-leveling laser apparatus of claim 1, further comprising a transmission mechanism connecting the motor and the locking member.

9. A self-leveling laser apparatus of claim 1, wherein the transmission mechanism comprising a gear mounted on an output shaft of the motor and a rack fixedly mounted on the locking member.

10. A self-leveling laser apparatus of claim 1, further comprising a damping device for attenuating a swinging movement of the pendulum.

* * * * *